Patented Oct. 20, 1953

2,656,312

UNITED STATES PATENT OFFICE 2,656,312

STABILIZATION OF PHENOL ALKYLATES

Donald R. Stevens, Wilkinsburg, and Samuel C. Camp, Richland Township, Allegheny County, Pa., assignors to Gulf Research & Development Company, Pittsburgh, Pa., a corporation of Delaware No Drawing. Application October 31, 1949, Serial No. 124,725

8 Claims. (Cl. 202—57)

This invention relates to the stabilization of phenol alkylates, and it is particularly concerned with a method of inhibiting the dealkylation of alkylated phenols when they are subjected to temperatures normally causing dealkylation.

Phenol or its homologs, such as the cresols, xylenols, and ethyl phenols, are readily alkylated with olefins, particularly the tertiary olefins (olefins capable of forming tertiary alcohols on hydration) in the presence of a catalyst such as sulfonic acids; sulfuric acid; alkyl esters of sulfuric acid; aluminum chloride; hydrogen chloride; zinc chloride; boron trichloride; boron trifluoride; complexes of boron trihalides with water, ethers, alcohols, etc.; and phosphoric acid. The resulting crude alkylate, however, is acidic and will tend to undergo dealkylation at elevated temperatures unless the acid component is removed or its dealkylation-promoting tendency is inhibited. For example, when a mixture of meta- and para-cresol is alkylated with the isobutylene of a $C_4$ refinery gas cut in the presence of sulfuric acid, the resulting crude alkylate usually contains a mixture of mono- and di-tertiary-butyl para-cresol, and mono- and di-tertiary-butyl meta-cresol, together with some extraneous non-phenolic acidic materials such as sulfuric acid, mono-tert-butyl sulfate, mono-sec-butyl sulfate, di-sec-butyl sulfate, sulfonic acids, sulfones, and the like. The di-tertiary-butyl para-cresol is particularly useful as an anti-oxidant in petroleum products such as cracked gasoline, lubricating and insulating oils, greases, and the like. The di-tertiary-butyl meta-cresol is useful in the reclaiming of rubber, as a tackifier, and in the preparation of surface active agents, and also is a useful starting material in processes of chlorination, nitration, hydrogenation, vinylation, sulfurization, aldehyde condensation, and the like. The mono-tertiary-butyl cresols may be treated with sulfur dichloride to form rubber stabilizers or they can be recycled for further alkylation. Accordingly, it is desirable to fractionate the crude alkylate to obtain cuts predominating in a single phenolic compound.

Before the crude alkylate is fractionated, however, it must be stabilized against dealkylation because the acidic materials present in the alkylate act as dealkylation catalysts even at the temperature required for vacuum distillation. Stabilization of the alkylate is important, of course, not only when the alkylate is subjected to fractional distillation but also when the alkylate is subjected to temperatures normally causing dealkylation in the presence of small amounts of acidic materials. Such temperatures are often encountered when the alkylate is used as a chemical intermediate.

In the past various stabilization procedures have been employed but none produces an alkylate which will not dealkylate when heated to a dealkylating temperature. According to one of the prior stabilization procedures the acidic alkylate is washed with an excess of a dilute aqueous alkali solution such as an aqueous 5 to 10 per cent solution of sodium hydroxide at room temperature. This procedure partially stabilizes the alkylate in that it removes the easily neutralizable materials such as sulfuric acid, mono-tert-butyl sulfate, mono-sec-butyl sulfate, and the sulfonic acids, but it does not remove the more refractory materials such as di-sec-butyl sulfate and probably other acidic or potentially acidic materials. A stabilization procedure which produces a more nearly stable alkylate comprises washing the acidic alkylate with an excess of a dilute aqueous alkali solution at a temperature above about 100° C. under superatmospheric pressure. The alkylate obtained even by this more severe treatment, however, is not completely stabilized in that it will also dealkylate when heated to ordinary dealkylating temperatures or temperatures approximating its boiling point.

We have found that an alkylate stabilized against dealkylation at elevated temperatures can be obtained by washing the crude acidic alkylate with a non-acid aqueous medium, adding to the washed alkylate an aqueous 10 to 40 per cent sodium hydroxide solution in an amount corresponding to at least the stoichiometric quantity necessary to neutralize the extraneous non-phenolic acidic matter in said washed alkylate, and heating the resulting solution to a temperature between about 75° and 100° C.

The stoichiometric amount of sodium hydroxide to be added to the washed alkylate can be determined from the saponification number (ASTM D94–41T) of the washed alkylate. While the saponification number does not necessarily give an accurate indication of the amount of the non-phenolic acidic material present in any alkylated phenol, it is generally sufficiently accurate for the purposes of our invention. When phenol itself is alkylated, a portion of the alkylated product may react with the caustic potash used in carrying out the saponification number test with the result that a saponification number above that resulting only from the non-phenolic acidic material would be obtained. In general, however, the increase in the saponification number resulting from the reaction of the phenolic material with the alkali is so small that it can be disregarded. It should be understood, however, that the stoichiometric amount of sodium hydroxide should be based upon the amount theoretically required to neutralize the extraneous, non-phenolic acidic material in the alkylate.

In accordance with our process, washing of the crude acidic alkylate with a non-acid aqueous medium removes the water-soluble and easily neutralizable materials from the alkylate, such as free sulfuric acid, mono-tert-alkyl sulfates, mono-sec-alkyl sulfates, and sulfonic acids. By adding an aqueous 10 to 40 percent solution of sodium hydroxide to the washed alkylate in an amount corresponding to at least the stoichiometric quantity necessary to neutralize the extraneous non-phenolic acidic matter in the alkylate, and then heating the resulting solution to a temperature between about 75° and 100° C., the dealkylation-promoting tendency of the remaining acidic bodies consisting of the more refractory materials such as di-sec-alkyl sulfates, sulfones, and the like, is inhibited.

For washing the crude acidic alkylate, we use a neutral or basic aqueous material which effectively removes the water-soluble and the easily neutralizable acidic material from the acid alkylate. Naturally, if the alkylated phenol is soluble in, or reacts with, dilute aqueous alkali solutions, we will employ only water for washing purposes in the first step. However, in the case of meta- or para-cresol, the alkylated derivatives are not soluble in and do not react with dilute aqueous alkali solutions so that the crude acidic alkylated cresols can be washed with either water or dilute aqueous alkali solutions. For example, we have found that water and dilute solutions of aqueous caustic soda produce good results. Aqueous solutions of other alkalies, such as potassium hydroxide and ammonium hydroxide, can also be used. In some instances where the alkylate is strongly acid, an economic procedure to follow is to wash the crude acidic alkylate first with water and then with a dilute aqueous alkali solution, i. e., aqueous 5 to 10 per cent alkali solution. The amount of aqueous alkaline solution used in such instances will vary depending upon the acid content of the alkylate. Washing of the crude acidic alkylate can be carried out at room temperature or at an elevated temperature either batchwise or continuously. In batch operation the acidic phenol alkylate is introduced into a vessel along with a suitable quantity of the non-acid aqueous solution. When the non-acid aqueous solution is water, it is generally employed in amounts ranging from one-half volume to several volumes of water per volume of alkylate. This volume is used even when the water washing is followed by washing with alkali. The water washing may be carried out in one or more stages. When the non-acid aqueous solution is alkali, it is generally employed in amounts ranging from one to several times the stoichiometric quantity. The alkylate and the aqueous solution are then agitated together for a time sufficient to remove the water-soluble and the easily neutralizable acidic material. The mixture is then allowed to settle and the aqueous phase is separated from the non-aqueous phase. To the non-aqueous phase is then added the stoichiometric quantity of an aqueous 10 to 40 per cent sodium hydroxide solution.

After adding the stoichiometric quantity of sodium hydroxide to the non-aqueous phase, the resulting solution is heated at atmospheric pressure to a temperature between about 75° C. and 100° C. The butylated cresols are advantageously heated to a temperature between about 80° and 95° C. There is nothing critical about the period of heating. The only requisition is that the solution be heated to a temperature between about 75° and 100° C. Prolonged heating periods can be employed without deleteriously affecting the stabilizing efficiency of the sodium hydroxide solution but such prolonged heating periods do not produce an alkylate that is any more stable than one which has been heated only a short time.

We have found that the solution of aqueous sodium hydroxide must contain at least 10 per cent by weight of sodium hydroxide. Depending upon the nature of the acidic constituents in the alkylate and the washing agent employed in the first step of our process, the minimum sodium hydroxide concentration for complete stabilization in the second step may be between about 10 and 20 per cent. More than the stoichiometric quantity of sodium hydroxide necessary to neutralize the alkylate can be used without adversely affecting the stability of the alkylate but from an economic standpoint it is not desirable to use more than the least amount required to produce a stable alkylate. As will be shown hereinbelow, fulfillment of either one of the aforementioned critical conditions without the other does not produce a stable alkylate.

The effectiveness of stabilizing a crude acidic alkylate in steps comprising washing the alkylate with a non-acid aqueous medium, adding to the washed alkylate at least the stoichiometric quantity of a 10 to 40 per cent aqueous solution of sodium hydroxide and heating to a temperature between about 75° and 100° C. will be demonstrated by the following dealkylation test in which a given amount of treated alkylate is subjected to fixed dealkylation heating conditions so that the results in a series of tests are directly comparable.

In carrying out this test, 10 grams of treated alkylate are placed in a glass chamber of about 50 milliliter capacity surrounded by a bath of vapors from boiling nitrobenzene. The chamber is connected through a condenser to a gasometer filled with saturated salt water for collecting the gas evolved. In this way the extent of the dealkylation occurring is indicated by the volume of gas collected in the gasometer, which corresponds to the volume of salt water displaced. In this test the alkylate is heated at about 205° C. for two hours, and the volume of gas collected at the end of 30, 60 and 120 minutes is noted and recorded. The recorded figures thus give numerical values which can conveniently be used to compare and evaluate the respective stabilization efficiency of different stabilizing procedures.

In the application of the above test to commercial practice an alkylate is considered to be completely stabilized when the amount of gas collected between 30 and 120 minutes (Δ120–30) is zero. In strongly acidic alkylates, however, substantial dealkylation may take place in the first 30 minutes, in which case the amount of gas collected during the next 90 minutes may be small. Thus in evaluating the stabilization efficiency of a particular stabilizing process the Δ120–30 value should be considered in connection with the volume of gas collected during the first 30 minutes. For instance, a 10 gram portion of an acidic di-tertiary-butyl cresol may have a Δ120–30 value as low as 90, but the volume of gas given off in the first 30 minutes may be as much as 1750 cc., indicating almost complete dealkylation. Theoretically, a 10 gram portion of a di-tertiary-butyl cresol should upon dealkylation produce about 1900 cc. of isobutylene.

Even with stabilized alkylates some gas is collected at the start of the test as a result of the expansion of air dissolved in, or introduced along with, the sample, and also from expansion of residual moisture contained in the alkylate. To determine what portion of the initial gas collected may result from the expansion of air in the heating zone of the dealkylation apparatus, a 10 gram sample of pure 2,6-di-tertiary-butyl para-cresol was introduced and heated. At the end of 120 minutes, 40 cc. of gas had collected. The 40 cc. of gas collected is thus considered to be a measure of the air introduced into the system along with the sample. To determine what portion of the initial gas may result from the combined air and moisture content, a 10 gram sample of alkylate was treated by refluxing for several hours in 100 grams of absolute alcohol containing 10 grams of potassium hydroxide. The alkylate was then water washed and allowed to stand overnight in a desiccator containing $P_2O_5$. A measurement in the dealkylation apparatus showed 120.0 cc. of gas evolved in 30 minutes and 137.0 cc. at the end of 120 minutes. The 137 cc. of gas is considered to correspond to the air and moisture content introduced with the sample. Accordingly, in the following examples gas volumes higher than about 140 cc. may be considered to be isobutylene.

In the following specific examples the crude acidic alkylate was obtained by alkylating a close-boiling meta-para-cresol mixture with the isobutylene contained in a refinery $C_4$ cut using 5 per cent of concentrated sulfuric acid as the catalyst. The alkylated derivatives employed in the following examples do not react with, and are not soluble in, dilute aqueous alkali solutions; therefore, the saponification numbers are considered to be accurate indications of the non-phenolic acidic material present in the alkylates.

Example 1

In this example, crude acidic alkylate obtained as described above and having a saponification number of 9.0 was thoroughly agitated with an equal volume of water at room temperature for 15 minutes. The washed alkylate thus obtained had a saponification number of 2.45. When 10 grams of this alkylate was subjected to the above-described dealkylation test there were 1644.0 cc. of gas collected in 30 minutes and 1900.0 cc. of gas collected at the end of 120 minutes. This volume of gas corresponds to the theoretical amount of isobutylene present and therefore indicates substantially complete dealkylation of the alkylate washed only with water.

Example 2

The theoretical amount of sodium hydroxide required to neutralize 10 grams of the alkylate obtained in Example 1 and having a saponification number of 2.45 is 0.018 gram. Accordingly, experiments were made in which separate 10 gram portions of the washed alkylate obtained from Example 1 were treated at 95° C. for 30 minutes with the theoretical amount of aqueous sodium hydroxide of various concentrations. The data obtained when the separately treated alkylates were subjected to the dealkylation test are given in the following table:

| Experiment No. | Wt. NaOH per 10 gm. Alkylate | Concentration of the NaOH, percent | Gas Collected (cc.) | | | Δ120-30 |
| --- | --- | --- | --- | --- | --- | --- |
| | | | 30 min. | 60 min. | 120 min. | |
| 1 | 0.0 | | 1,644.0 | 1,873.0 | 1,900.0 | 256.0 |
| 2 | 0.018 | 3.0 | 330.0 | 720.0 | 1,121.0 | 791.0 |
| 3 | 0.018 | 5.0 | 334.0 | 640.0 | 985.0 | 651.0 |
| 4 | 0.018 | 8.0 | 187.0 | 284.0 | 465.0 | 278.0 |
| 5 | 0.018 | 10.0 | 136.0 | 136.0 | 136.0 | 0.0 |
| 6 | 0.018 | 18.0 | 119.0 | 120.0 | 120.0 | 1.0 |

It can be seen from the above data that substantially complete dealkylation occurred (Experiment No. 1) when the alkylate obtained from Example 1 was subjected to the dealkylation test. It is further shown that while aqueous 3, 5 and 8 per cent sodium hydroxide solutions gave some improvement with respect to dealkylation, complete stabilization of the alkylate was not obtained until the concentration of the sodium hydroxide was at least 10.0 per cent. The gas collected during the test period in Experiments 5 and 6 is considered to result from the air and moisture introduced with the alkylate.

Example 3

In order to illustrate the importance of contact temperature when employing the theoretical amount of a 10 per cent aqueous sodium hydroxide solution, Experiment 5 of Example 2 was repeated using various contacting temperatures. The results obtained when the treated alkylates were subjected to the dealkylation test are given in the following table:

| Experiment No. | Wt. NaOH per 10 gm. Alkylate | Concentration of the NaOH, Percent | Treating Temperature, °C. | Gas Collected (cc.) | | | Δ120-30 |
| --- | --- | --- | --- | --- | --- | --- | --- |
| | | | | 30 min. | 60 min. | 120 min. | |
| 5 | 0.018 | 10.0 | 95 | 136.0 | 136.0 | 136.0 | 0.0 |
| 7 | 0.018 | 10.0 | 80-85 | 146.0 | 146.0 | 146.0 | 0.0 |
| 8 | 0.018 | 10.0 | 68-73 | 295.0 | 520.0 | 862.0 | 567.0 |
| 9 | 0.018 | 10.0 | 30 | 274.0 | 1,020.0 | 1,503.0 | 1,229.0 |

From the above data it can be seen that a treating temperature of from 80° to 95° C. produces an alkylate which is completely stable, and that temperatures of from 30° to 68° C. do not produce stable alkylates. The gas collected in Experiments 5 and 7 is considered to result from the air and moisture content of the alkylate.

Example 4

A crude acidic alkylate similar to that used in Example 1 but having a saponification number of 15.1 was washed at room temperature with an excess of aqueous 10 per cent NaOH. The washed alkylate had a saponification number of 1.2. Separate 10 gram samples of the washed alkylate were treated at 95° C. for 30 minutes with the theoretical amount of aqueous sodium hydroxide of various concentrations. The data obtained when the separately treated alkylates were subjected to the dealkylation test as compared with the untreated alkylate are given in the following table.

| Experiment No. | Wt. NaOH per 10 gm. Alkylate | Concentration of the NaOH, Percent | Gas Collected (cc.) | | | Δ120-30 |
|---|---|---|---|---|---|---|
| | | | 30 min. | 60 min. | 120 min. | |
| 10 | none | | 402.0 | 798.0 | 1,185.0 | 783.0 |
| 11 | 0.0088 | 5.0 | 101.0 | 163.0 | 432.0 | 331.0 |
| 12 | 0.0088 | 10.0 | 130.0 | 190.0 | 332.0 | 202.0 |
| 13 | 0.0088 | 15.0 | 108.0 | 108.0 | 148.0 | 40.0 |
| 14 | 0.0088 | 20.0 | 79.0 | 79.0 | 79.0 | 0.0 |
| 15 | 0.0088 | 40.0 | 106.0 | 110.0 | 115.0 | 9.0 |

It is evident from the above that substantial improvement with respect to delkylation was obtained when the concentration of the NaOH was 10 per cent, but that complete stabilization of the alkylate was not obtained until the concentration of the sodium hydroxide was 20.0 per cent. The gas collected during the first 30 minutes in Experiments 12, 13, 14 and 15 is considered to represent the amount of air and moisture introduced with the sample of alkylate.

While the invention has been described herein with particular reference to certain embodiments and specific examples by way of illustration, it is to be understood that the invention is not limited to such embodiments and specific examples except as hereinafter defined in the appended claims.

We claim:

1. A method of inhibiting the dealkylation of crude acidic alkylated phenols at elevated temperatures which comprises washing said alkylated phenols with a non-acid aqueous medium, adding to the washed alkylate an aqueous 10 to 40 per cent sodium hydroxide solution in an amount corresponding to at least the stoichiometric quantity necessary to neutralize the extraneous non-phenolic acidic matter in said washed alkylate, and heating the resulting solution to a temperature between about 75° and 100° C.

2. A method of inhibiting the dealkylation of crude acidic alkylated phenols at elevated temperatures which comprises washing said alkylated phenols with water, adding to the washed alkylate an aqueous 10 to 40 per cent sodium hydroxide solution in an amount corresponding to at least the stoichiometric quantity necessary to neutralize the extraneous non-phenolic acidic matter in said washed alkylate, and heating the resulting solution to a temperature between about 75° and 100° C.

3. In the process of separating crude acidic alkylated phenols by fractional distillation, the improvement which comprises washing said alkylated phenols prior to distillation with a non-acid aqueous medium, adding to the washed alklyate an aqueous 10 to 40 per cent sodium hydroxide solution in an amount corresponding to at least the stoichiometric quantity necessary to neutralize the extraneous non-phenolic acidic matter in said washed alkylate, and heating the resulting solution to a temperature between about 75° and 100° C.

4. A method of stabilizing an acidic phenol alkylate which comprises washing said alkylate with a non-acid aqueous medium, adding to the washed alkylate an aqueous 10 to 40 per cent sodium hydroxide solution in an amount corresponding to at least the stoichiometric quantity necessary to neutralize the extraneous non-phenolic acidic matter in said washed alkylate, and heating the resulting solution to a temperature between about 75° and 100° C.

5. The method of claim 4 wherein the non-acid aqueous medium consists of water.

6. The method of claim 4 wherein the non-acid aqueous medium is a dilute aqueous alkali solution.

7. A method of stabilizing an acidic cresol alkylate which comprises washing said alkylate with an equal volume of water at room temperature, adding to the washed alkylate an aqueous 10 per cent sodium hydroxide solution in an amount corresponding to at least the stoichiometric quantity necessary to neutralize the extraneous non-phenolic acidic matter in said washed alkylate, and heating the resulting solution to a temperature between about 80° and 95° C.

8. A method of stabilizing an acidic cresol alkylate which comprises washing said alkylate with an excess of aqueous 10 per cent sodium hydroxide at room temperature, adding to the washed alkylate an aqueous 20 per cent sodium hydroxide solution in an amount corresponding to at least the stoichiometric quantity necessary to neutralize the extraneous non-phenolic acidic matter in said washed alkylate, and heating the resulting solution to a temperature between about 80° and 95° C.

DONALD R. STEVENS.
SAMUEL C. CAMP.

References Cited in the file of this patent

UNITED STATES PATENTS

| Number | Name | Date |
|---|---|---|
| 1,948,287 | Buc | Feb. 20, 1934 |
| 2,050,188 | Lee | Aug. 4, 1936 |
| 2,073,997 | Raiziss | Mar. 16, 1937 |
| 2,248,828 | Stevens | July 8, 1941 |
| 2,301,709 | Rumscheidt | Nov. 10, 1942 |
| 2,310,663 | Weinrich et al. | Feb. 9, 1943 |
| 2,393,154 | Franklin | Jan. 15, 1946 |
| 2,415,069 | Arvin | Feb. 4, 1947 |
| 2,493,781 | Schneider | Jan. 10, 1950 |
| 2,494,310 | Plueddeman | Jan. 10, 1950 |
| 2,497,503 | Jones | Feb. 14, 1950 |
| 2,499,236 | Van Gilder et al. | Feb. 28, 1950 |
| 2,502,001 | Feasley | Mar. 28, 1950 |
| 2,529,209 | Ayo | Nov. 7, 1950 |
| 2,544,292 | Blake | Mar. 6, 1951 |
| 2,553,470 | Pines | May 15, 1951 |
| 2,560,666 | Stevens | July 17, 1951 |